Feb. 24, 1925.

C. E. STEVENSON

MUD CHAIN FASTENER

Filed June 23, 1924

1,527,334

C. E. Stevenson
Inventor

By Clarence A. O'Brien
Attorney

Patented Feb. 24, 1925.

1,527,334

UNITED STATES PATENT OFFICE.

CLAYTON E. STEVENSON, OF CLAY CENTER, KANSAS.

MUD-CHAIN FASTENER.

Application filed June 23, 1924. Serial No. 721,830.

*To all whom it may concern:*

Be it known that I, CLAYTON E. STEVENSON, a citizen of the United States, residing at Clay Center, in the county of Clay and State of Kansas, have invented certain new and useful Improvements in Mud-Chain Fasteners, of which the following is a specification.

This invention relates to fastening devices especially adapted to be used for connecting the ends of mud chain sections together, and it consists in the novel features hereinafter described and claimed.

An object of the invention is to provide a fastener of the character stated, which is of simple and durable structure and having a hook portion which may be used for a lever for drawing the ends of the chain section toward each other, and means for securing the hook member with relation to the chain sections.

Figure 1:
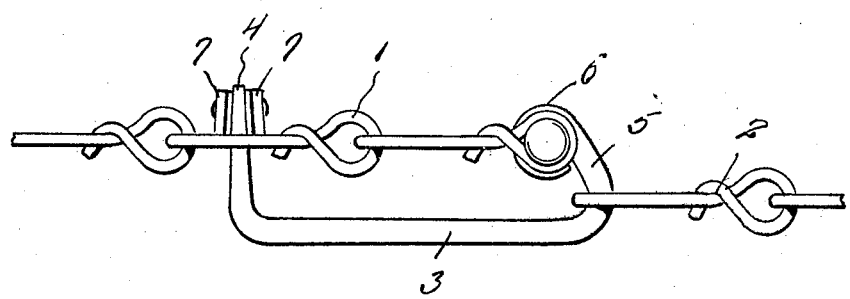
Figure 1 is a side elevation of the mud chain fastener, showing the same applied.

The chain sections to which the fastener is applied, are indicated at 1 and 2 in the drawings. The fastener comprises a hook member 3, which is formed from a length of rod having the rectangularly disposed end portion 4 and the acute angle end portion 5, the portion 5 being provided with a terminal loop 6. Keeper bars 7 are secured by the pivot bolts 8, one at each side of the rectangularly disposed portion 4 of the hook member.

Figure 2:
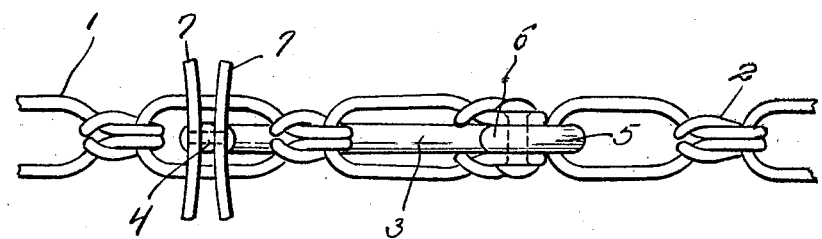
Figure 2 is an edge elevation thereof.
Figure 3:
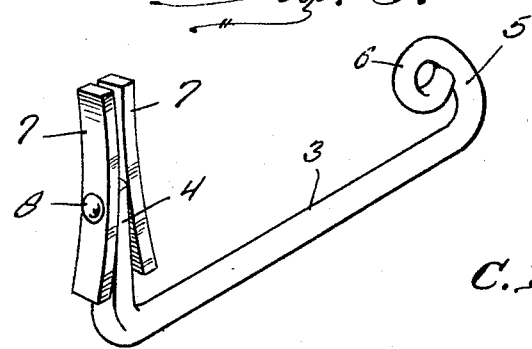
Figure 3 is a perspective view of the chain fastener detached.

The loop 6 is engaged with the terminal link of the chain section 1. When the fastener is applied, the bars 7 are swung to the position shown in Figure 3, where they are approximately parallel with the portion 4 of the hook member, and the said bars of the portions 4 are passed through the terminal link of the chain section 2. Then, by using the hook member 3 as a lever, the chain sections 1 and 2 are drawn longitudinally toward each other, whereby the rectangularly disposed portion 4 is swung back along the intermediate portion of the chain section 1 and the bars 7 are passed with the portion 4, through one of the intermediate links of the chain section 1. The bars 7 are then swung transversely upon the pivot bolts 8, so that they are disposed transversely across said link, through which the portion 4 of the hook member 3 are passed, and assume the position as shown in Figures 1 and 2 of the drawings.

Having described the invention, what is claimed is:

A chain fastener comprising a member having angularly disposed end portions, one of which is provided with a loop, keeper bars pivotally mounted at points approximately mid way between their ends to the other angularly disposed end portion of the member and arranged one at each side of the said portion and adapted to swing transversely of the intermediate portion of the said member.

In testimony whereof I affix my signature.

CLAYTON E. STEVENSON.